(12) United States Patent
Beck

(10) Patent No.: US 7,979,145 B1
(45) Date of Patent: Jul. 12, 2011

(54) METHOD OF SCRIPT SELECTION

(76) Inventor: Keith E. Beck, Chicago, IL (US)

(*) Notice: Subject to any disclaimer, the term of this patent is extended or adjusted under 35 U.S.C. 154(b) by 1108 days.

(21) Appl. No.: 11/789,316

(22) Filed: Apr. 24, 2007

(51) Int. Cl.
G06F 19/00 (2011.01)

(52) U.S. Cl. ............. 700/91; 700/92; 463/1; 463/9; 463/16; 463/34; 463/40; 463/42

(58) Field of Classification Search ............ 463/1, 9, 463/16, 34, 40, 42; 700/91, 92
See application file for complete search history.

(56) References Cited

U.S. PATENT DOCUMENTS

| | | | |
|---|---|---|---|
| 4,364,299 A | 12/1982 | Nakada et al. | |
| 6,569,012 B2 | 5/2003 | Lydon et al. | |
| 6,968,243 B1 | 11/2005 | Oh | |
| 2003/0171982 A1* | 9/2003 | Paul | 705/12 |
| 2004/0023734 A1* | 2/2004 | McClain | 473/409 |
| 2006/0074504 A1* | 4/2006 | Maul | 700/91 |
| 2007/0090599 A1* | 4/2007 | Hamilton | 273/292 |
| 2007/0293290 A1* | 12/2007 | McNally | 463/7 |
| 2008/0032799 A1* | 2/2008 | Hamilton et al. | 463/42 |
| 2008/0167107 A1* | 7/2008 | Goss | 463/16 |

OTHER PUBLICATIONS

U.S. Appl. No. 09/931,084, filed Mar. 21, 2002, Neulight.
U.S. Appl. No. 10/092,269, filed Sep. 11, 2003, Paul.
U.S. Appl. No. 10/617,993, filed Jan. 29, 2004, Toth.
U.S. Appl. No. 10/634,053, filed Jun. 10, 2004, Hasday.
U.S. Appl. No. 10/958,933, filed Apr. 6, 2007, Maul.
Keith Beck, "The Last Play Standing Process" 2005, 14 pages, Chicago, Illinois.

* cited by examiner

Primary Examiner — Pierre Eddy Elisca
Assistant Examiner — Shahid Kamal
(74) Attorney, Agent, or Firm — Joan I. Norek; The Law Office of Joan I. Norek

(57) ABSTRACT

An elimination-style script-selection method includes a workshop reading of scripts performed before participants who have taken a theater-patronage-frequency survey. Any parallel survey responses between participants of disparate theatrical-patronage patterns are detected, and a weight adjustment factor is applied based thereon.

8 Claims, 6 Drawing Sheets

Script Title _____ Date _____

Round I   The Cold Reading Workshop

For each scene, indicate with a check mark or [X] how you feel about each numbered statement below.

| 1st Scene | D3 | D2 | D1 | N | A1 | A2 | A3 |
|---|---|---|---|---|---|---|---|
| 1  This scene was original. | | | | | | | |
| 2  The characters are truthfully written. | | | | | | | |
| 3  The dialog enhances the scene. | | | | | | | |
| 4  I like the content of this scene. | | | | | | | |
| 5  This scene is riveting. | | | | | | | |
| Yawn Factor | | | | | | | |
| I was bored with the scene. | | | | | | | |
| Your Reactions to Both Scenes | | | | | | | |
| 1  These scenes were original. | | | | | | | |
| 2  The characters are truthfully written. | | | | | | | |
| 3  The dialog enhances the scenes. | | | | | | | |
| 4  I like the content of these scenes. | | | | | | | |
| 5  These scene were riveting. | | | | | | | |
| 6  I Gotta read the whole script; these scenes have something. | | | | | | | |
| Yawn Factor | | | | | | | |
| I was bored with the scenes. | | | | | | | |
| I completed this survey quickly | | | | | | | |

Wherein D means Disagree, A means Agree, N means Neutral, and number codes mean: 1 = Somewhat, 2 = (blank), 3 = Strongly Your Zip code 606 46
+ Your "Date" of birth 01/18/07    Your A.A.P. number is _____.
The A.A.P. number is 64

FIG. 5

Script Title _____ Date_____

Round II   The Reading

Based on the reading you just heard, please indicate with an [X] how you feel about each numbered statement below.

|   |   | D3 | D2 | D1 | N | A1 | A2 | A3 |
|---|---|---|---|---|---|---|---|---|
| 1 | Entertained by what I heard. | | | | | | | |
| 2 | Plot is well developed. | | | | | | | |
| 3 | Story lines 7 sub-plots are clear. | | | | | | | |
| 4 | I "Get" the theme/statement. | | | | | | | |
| 5 | Dialog really works for me. | | | | | | | |
| 6 | Is original/vibrant/riveting. | | | | | | | |
| 7 | I enjoyed the content. | | | | | | | |
| Character Appeal | | | | | | | | |
| 1 | Characters are believable. | | | | | | | |
| 2 | Characters are unique, original. | | | | | | | |
| 3 | I can see/hear/feel the characters – they are well developed. | | | | | | | |
| 4 | Their strengths/weaknesses are clear | | | | | | | |
| Emotional Rollercoaster | | | | | | | | |
| 1 | This script made me laugh. | | | | | | | |
| 2 | This script made me cry. | | | | | | | |
| 3 | This script made me sad. | | | | | | | |
| 4 | This script made me think. | | | | | | | |
| 5 | This script made me angry. | | | | | | | |
| Yawn Factor | | | | | | | | |
| | I was bored with the scenes. | | | | | | | |
| | I completed this survey quickly | | | | | | | |

Wherein D means Disagree, A means Agree, N means Neutral, and number codes mean: 1 = Somewhat, 2 = (blank), 3 = Strongly Your Zip code 606 46
+ Your "Date" of birth 01/18/07     Your A.A.P. number is _____.
   The A.A.P. number is 64

FIG. 6

METHOD OF SCRIPT SELECTION

BACKGROUND OF THE INVENTION

The present invention relates to methods of script selection. The present invention relates in particular to script selection for live theater performances. Conventional methods used for selecting scripts rely on winnowing out a few scripts for more serious consideration by theater professionals. Script submissions from relatively new authors, unsupported by recognized theatrical agents, may receive scant attention and never be seen by anyone beyond an entry-level theatrical assistant. Script submissions to small or community theaters might not be overly handicapped by the writer's lack of standing in the field, but nonetheless often receive little to no attention because resources are not available to handle all of the scripts submissions using conventional selection methods. Another problem seen in the theater is the not infrequent selection of scripts for performance which ultimately fail to garner any meaningful level of audience acceptance, whereby typically both the audience and the theater are placed into losing positions.

SUMMARY OF THE INVENTION

The present invention provides an elimination-style script-selection method that identifies the play/script among a group of scripts which has the greatest positive audience-acceptance potential by detection or recognition of survey response-patterns that signal script charisma not otherwise revealed by, or seen in, straight survey tallies. The present script-selection method collects data external to the direct survey tallies and then uses the tally-external data to detect or recognize parallel survey responses from participants of disparate theatrical-patronage patterns. Upon detection of a set of parallel survey responses, a weight adjustment factor is used to convert raw survey tallies into refined survey tallies.

The present invention provides an elimination-style script-selection method which identifies the play/script among a group of scripts which has the greatest positive audience-acceptance potential without a reading of the scripts in their entireties.

The present invention provides an elimination-style script-selection method which, preferably while remaining anonymous, identifies sequential surveys of individual participants.

The present invention provides such an elimination-style script-selection method which reduces system-induced bias and partiality by the avoidance of visible numeric rankings of response selections, and by the availability of neutral response positions.

The present invention provides such an elimination-style script-selection method which reduces system-induced recall deficiencies by the availability of inter-segment preliminary queries. The present invention also provides other advances described below.

BRIEF DESCRIPTION OF THE SEVERAL VIEWS OF THE DRAWINGS

FIG. 5 is a survey form for Round I of the present invention.

FIG. 6 is a survey form for Round II of the present invention.

DETAILED DESCRIPTION OF THE INVENTION

Figure 1:
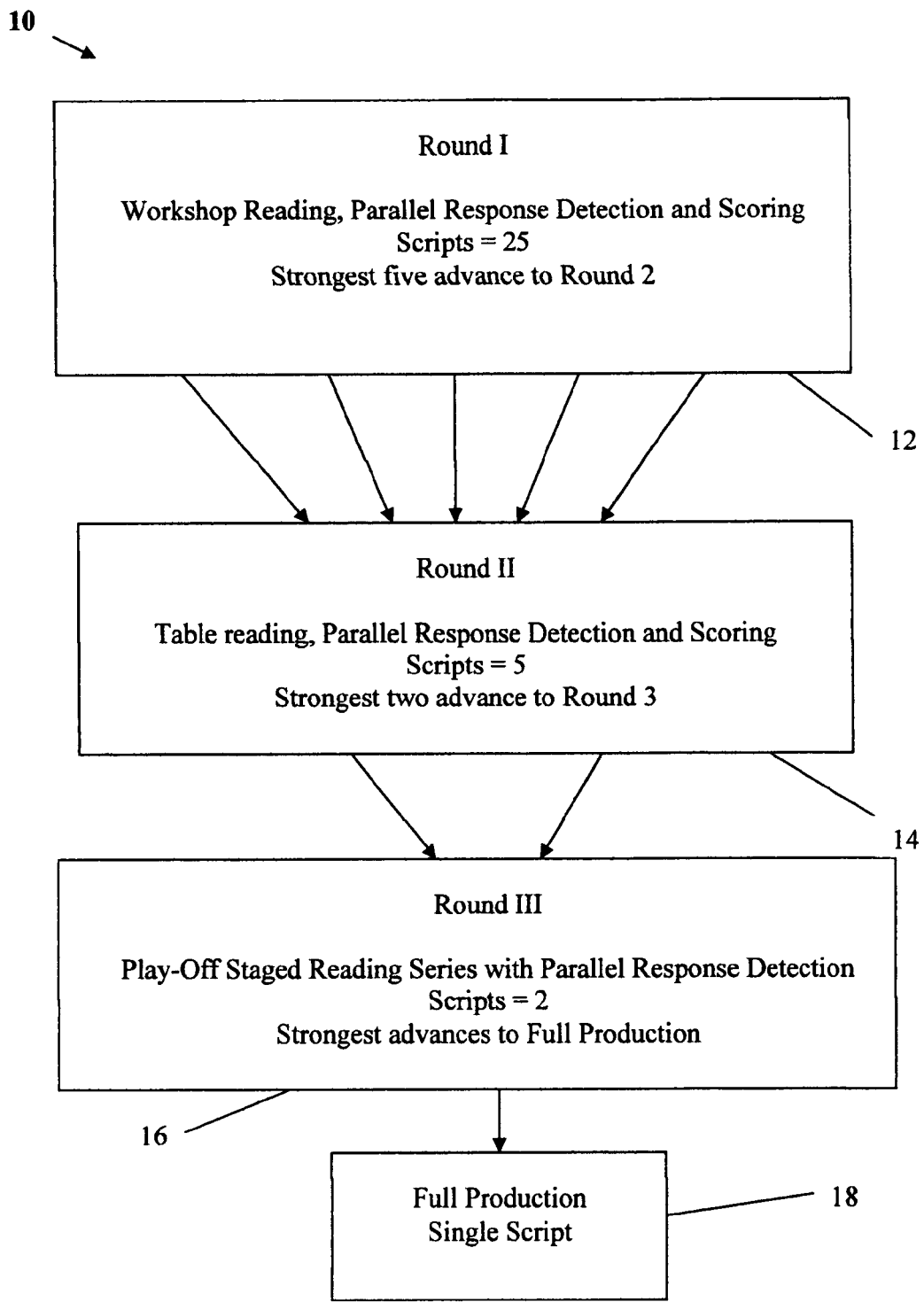
FIG. 1 is a flow diagram of a script selection method of the present invention.

Referring to FIG. 1, an embodiment of the present invention is illustrated by a method embodied in a flow diagram and designated by general reference numeral 10. The method as shown is comprised of four broad steps. In Round I, the scripts that have been solicited and received, are subjected to a workshop reading, survey-participant surveying, parallel response detection and scoring process, described in more detail below. The Round I step requires of plurality of scripts, and preferably the scripts of Round I number twenty-five or more. The strongest five scripts advance from Round I to Round II, and undergo a table reading, parallel response detection and scoring process, described in more detail below. The strongest two scripts advance to Round III, and go through a play-off staged reading series and, parallel response detection. The strongest script advances to full production 18, described in more detail below.

Figure 2:
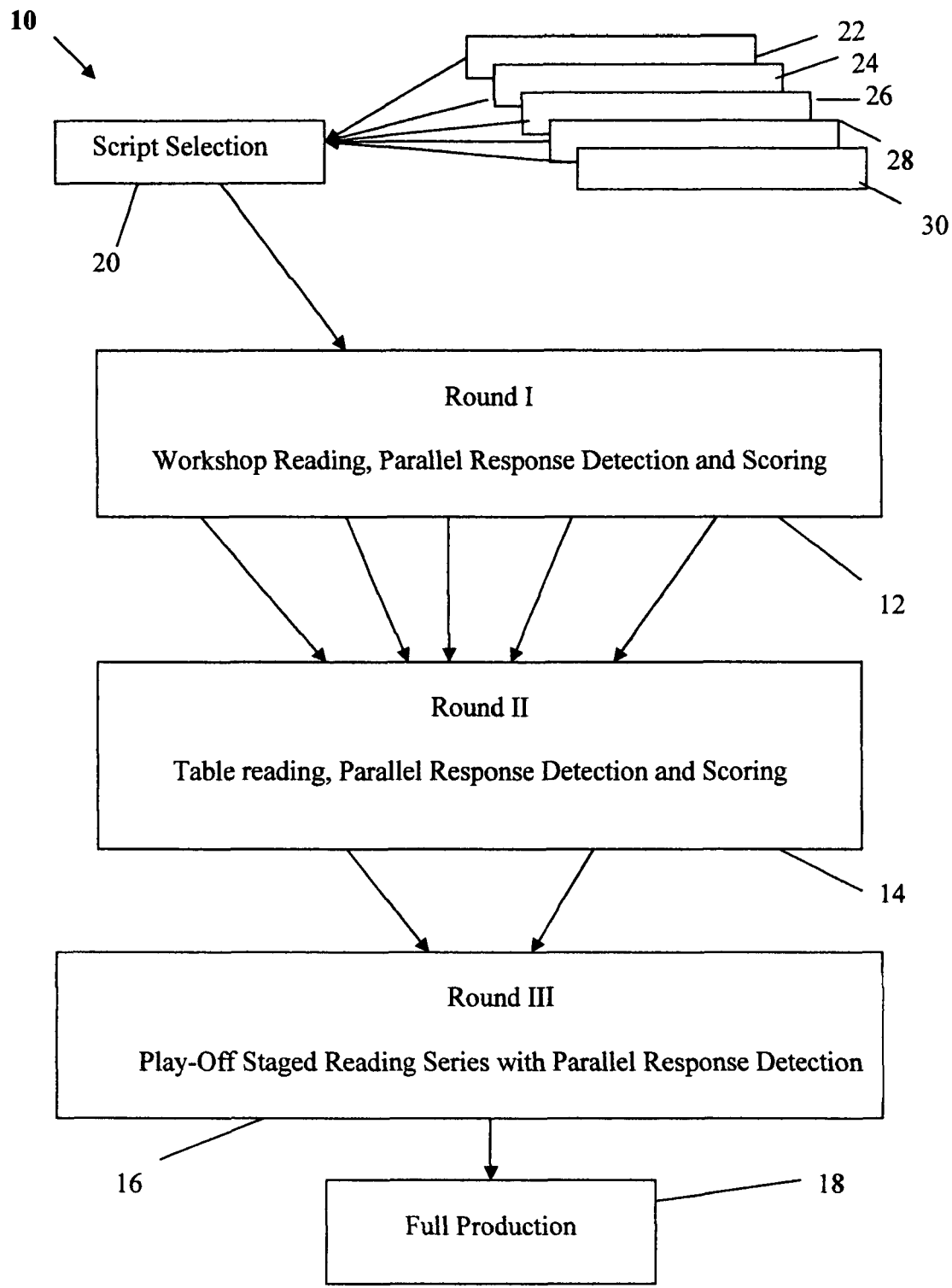
FIG. 2 is a flow diagram of the script selection method of FIG. 1, further including a script admission step the present invention.
Figure 3:
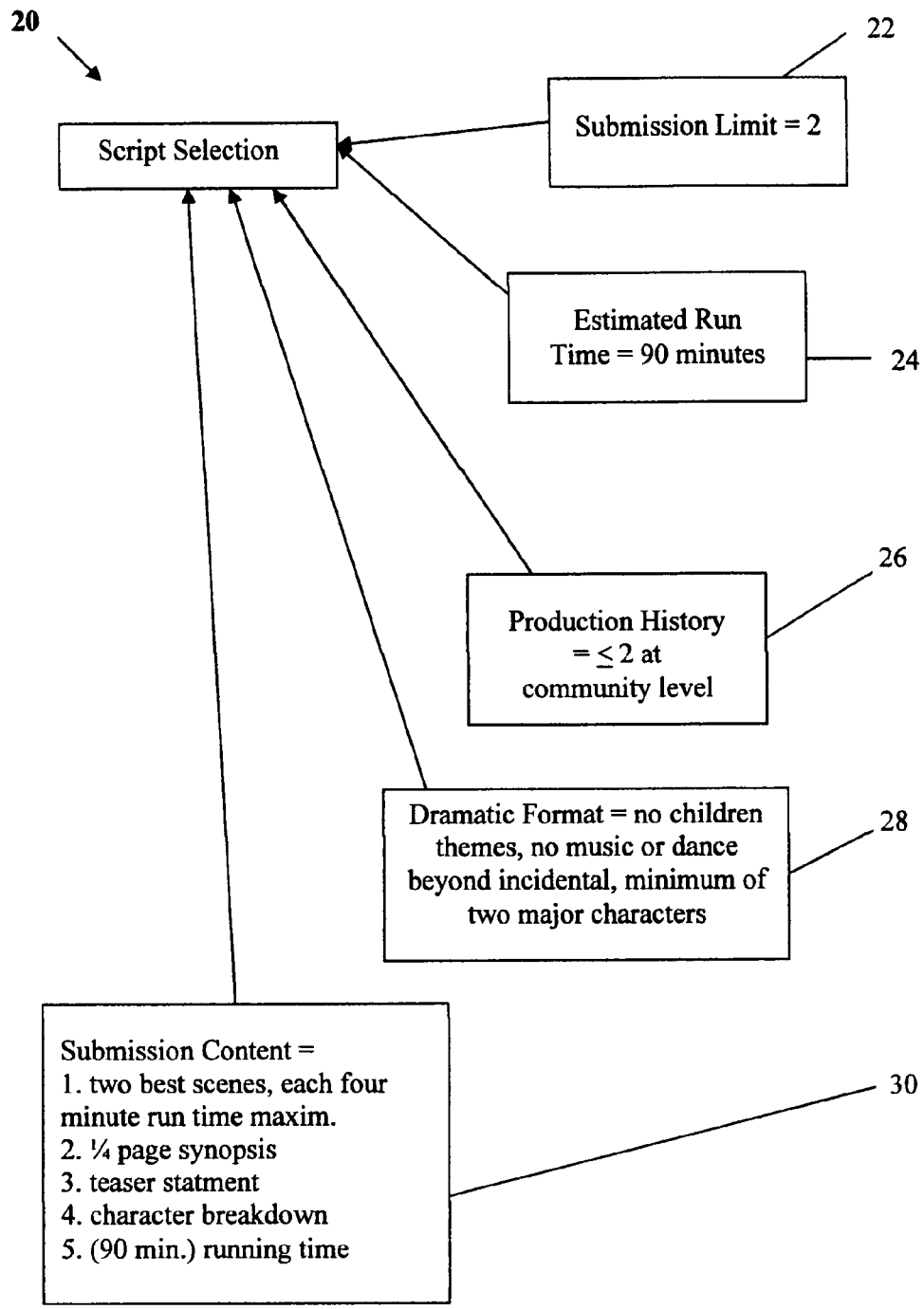
FIG. 3 is a flow diagram of details of the script admission step of FIG. 2.

Referring now to FIG. 2 and FIG. 3 also, the method preferably also includes a script acceptance step, designated by the general reference numeral 20, having a plurality of solicitation process criteria, such as designated criteria 22-30 in FIG. 2 and FIG. 3. The solicitation criteria set for any method of the present invention should typically include criteria from more than one, and not uncommonly all, of the following categories: submission limits 22; estimated run time 24; production history 26; dramatic format 28; and submission content 30.

When the number of scripts in the group entering the method is, for instance, the preferably minimum of twenty-five, a submission limit 22 in the range of from one or three per playwright is reasonable, and a limit of two per playwright as shown in FIG. 3 is normal. If the number of scripts in the group is higher, for instance forty or fifty, then the submission limit 22 might be within a broader range, for instance one to five, and a limit of three might be normal. Preferably the submission limit 22 is selected so as to afford playwrights an opportunity to submit more than a single script, while avoiding a severe excess of submissions, i.e., submissions that greatly outnumber the number in the acceptance group, that is, the group which will enter the method.

As shown in FIG. 3, the submission limit 22 chosen for the method having twenty-five entrants is two, which is more elastic than limiting each playwright to a single selection, but not so elastic that the odds of receiving a greatly excessive number of scripts are high.

The next script submission standards 20 item is estimated run time 24. The selection of the estimated run time 24 depends on the type of production desired for the full production 18. As shown in FIG. 3, the estimated run time 24 chosen for the method is that of a standard full length play, namely ninety minutes total running time. This full length play standard is based on patron expectations of a total time consumption of about two hours with one or two intermissions. An estimated run time 24 typically is no less than about thirty minutes and no more than about two hours. An estimated run time 24 can be expressed, or expressed alternatively, in approximate script page length. For example, the estimated run time 24 could be equated to 160 to 180 pages of script in standard 12 point font size, 8.5"×11" page format, which would reasonably demarcate a play of about 90 minutes total running time.

The next script submission standards 20 item is production history 26. The selection of the production history 26 depends on the breadth or leeway desired to given to prospective scripts. As shown in FIG. 3, the production history 26 chosen for the method, namely no more than twice at community level only, permits submissions of scripts which have undergone workshops and readings, and had had limited production. The inclusion of recognized or celebrated scripts, while not desired beyond Round I because the attached public recognition could skew true subjective scoring, is not however excluded from broad embodiments of the invention.

The next script submission standards 20 item is dramatic format 28. The selection of the dramatic format 28 depends on the type of production desired for the full production 18, and may include considerations such as the target audience and the production company ensemble. As shown in FIG. 2, the dramatic format 28 chosen for the method is exclusionary, namely no children themes, no music beyond incidental, no dance beyond incidental and a minimum of two characters having significant roles in the script. This full production 18 is appropriated when the production company is not accepting scripts for children's shows, musicals, or one-person shows. Other embodiments of the method of the present invention might instead be devoted solely to children's shows, musicals or one-person shows.

The next script submission standards 20 item is the submission content 30. The selection of the submission content 30 substantially determines the time required for the Round I, and therefore any major departure from the preferred submission content 30 range would diminish the goal of script selection without full script reading. As shown in FIG. 3, the submission content 30 of the method includes:

1. Two (2) best scenes or dialogue samples from the script, each no more than about four minutes running time, 12 point font, 8.5"×11" page format, with pages numbered, no more than about six pages (two best scenes, two most contrasting scenes or two scenes that define character or place).

2. Concise synopsis of the play describing the play's story in no more than a ¼ page, 720 character (including spaces) maximum, 12 point font, 8.5"×11" page format, to read aloud to the acting ensemble and survey audience.

3. Teaser statement for the play which should be a brief statement regarding the play, of no more than 350 characters, including spaces, using a 12 point font.

4. Character breakdown, which should include the number of men, women, and children, along with age breakdown, plus character details, and ages. Any special casting needs, i.e. children, animals, jugglers, and the like, should be noted.

5. Running time (estimated) for the whole play (about 90 minutes with one intermission is preferred), but no complete manuscripts. (The method of the present invention seeks to discover those sparks of truth which create riveting, engaging theater by working the submitted scenes thoroughly. If the sparks are not discovered in the two "best-representation scenes, they are unlikely to be found in the rest of the manuscript.)

To be valid (that is, most likely to lead to the selection of the script with the highest positive-reception potential), the method 10 must start with at least twenty-five script submissions of two scenes, which amounts to fifty scenes which are fed to Round I. Preferably all fifty Round I scenes will be performed within an eight week time frame.

The readings required in the method 10 are preferably cast with an acting ensemble of four women and four men. The readings for Round I and Round II are preferably not read by the cast or director prior to the Round-1 initial reading in front of a live audience.

The two best scenes or dialogue samples from the script preferably are preferably those which the playwright feels are the best scenes from of the play. The scenes preferably should those believed by the playwright to best represent his or hers talent, passion and gift.

The teaser statement preferably should create interest in the script while giving a quick view of the play. An example might be as follows. "What happens when five men and women play poker and the stakes get too high? Many old truths come to the surface, some grudges never die, and some debts are never paid. As the betting goes higher, family secrets are revealed that should remain forgotten."

The character breakdown provided should be for the play in its entirety, and not merely the submitted scenes.

If an ensemble is committed to working the submitted scenes thoroughly, those sparks of truth which create riveting, engaging theater will be discovered. It has surprisingly been found that if a committed ensemble does not find exciting theater in the two best scenes, exciting theater is unlikely to be found in the rest of the script.

Optional information which can, and at times for practical purposes should be, required in the submission content 30 includes a brief description of the playwright as an artist, information regarding where the scenes/script have been produced earlier, whether the playwright has been produced before, including what was produced, and when and where it was produced, whether any produced plays have been reviewed (including copies of the reviews), the playwrights perspective on revisions and previous workshop reading history and the number of revisions the submission has gone through. In addition, the submitting playwrights obviously would be required to provide identification and contact information, such as name, email address, address, telephone number(s) and the like.

The submission format is obviously a matter of choice, and the chosen format, for instance "electronic submission via email" should be clearly stated.

The cast preferably should keep in mind that they are working at an accelerated pace, and therefore common sense and safe, respectful work are just as important as the acting work. Stage directions generally should not be followed. The plays are new, and the stage directions are new. In new works, stage directions should be treated as guidelines that may or may not lead in the direction of the truthfulness the method is seeking. Actions that preferably are faked, no matter what the script says, preferably should include spitting, yelling in someone's ear, stomping on someone's foot, punching, slapping and the like. Preferably the readings are conducted entirely in pantomime, without props of any type.

Audience Information Questionnaire

Prior to the beginning of each round of method 10 the audience and the actors (the survey participants) preferably are asked to complete a questionnaire to identify: (1) those participants who regularly attend live theater performances and (2) those participants who do not regularly attend live theater performances.

Each member of the audience should be provided with an Anonymous Audience Participation Number ("AAP") which is the participants' identification that is tied to the survey each completes. The AAP number is used to define the charisma a particular script may have. The method 10 defines charisma as the inherent ability for the script to attract both regular theater goers (frequent theater patrons) and those who do not normally attend the theater (non-frequent theater patrons).

This concept is further defined in two key aspects, namely (a) identifying positive high scoring survey responses from both frequent and non-frequent theater patrons, and (b) identifying the perception of speed an audience member feels when an audience member has completed any of the survey forms.

If a script has high survey scores from both those who attend live theater frequently and those who do not attend theater frequently, and if these participants have the inherent perception that they answered the survey quickly without taking time to contemplate their answers, then the charisma factor of the script is higher then those scripts which leave the audience feeling unenthusiastic and perceiving that they answered the survey questions slowly.

Round I—The Workshop

Although other workshop rules can be implemented, a set of rules governing a dynamic interactive workshop is preferred. For instance, if any member of the cast of method 10 may tag into any scene to bring a new perspective to the work, and/or if any cast member or director may throw in the towel (literally) on any scene if he or she feels the material is not working, not appropriate, or simply not in the line with the expectations of the focus of the work, dynamics are brought to the workshop. The cast may vote whether to proceed to the survey directly, move to the next scene of the submission, or recast the scene and continue.

Scoring the Audience Information Survey

The quality of responses to question 1 and question 3 are combined. A numerical value is generated between 1 and 27. The lower the numerical value, the more likely the participant (participant) is considered to be a non-frequent theater patron. The higher the numerical value the more likely it is the participant is a frequent theater patron. This numerical value is referenced and checked with responses to question 2.

Anonymous Audience Participation Number AAP number

In preferred embodiment, the AAP number assigned to each participant is the total of the participant last two digits of the participant's zip code and the day of the month of participant's date of birth. This number is referenced with the date of attendance (performance date) to create a unique number. An example of an AAP number is 021007-7, which is derived from a zip code ending in "06" plus a date-of-birth day of the month of "01" together with a performance date of Feb. 10, 2007. The AAP number is used to reference all numerical survey values obtained and to anonymously identify frequent theater patrons (those participants who attend live theater often) and non-frequent (those participants who do not attend live theater often).

Round I—The Workshop—The Readings and Performances

All accepted script scenes, for instance fifty scenes from twenty-five script, should undergo the workshop reading and survey scoring in one of a plurality of workshop sessions. A series of sessions of about nine sequential sessions, each about three hours in duration, is preferred. Only after the conclusion of the entire series are the scripts ranked for the purpose of identifying the five scripts which will proceed to Round II, the remainder being eliminated.

The submitted script scenes preferably are reformatted into a two-column layout in 11 point Arial font, or other easy-to-read font, in the 8.5 by 11 inch size. The pages preferably are held in a simple report folder or the like. This reformatting provides more content on a page and is easier to use, avoiding disruptive page turning and thus allowing the actors to "stay in the moment" of the script being read without distractions.

Figure 4:
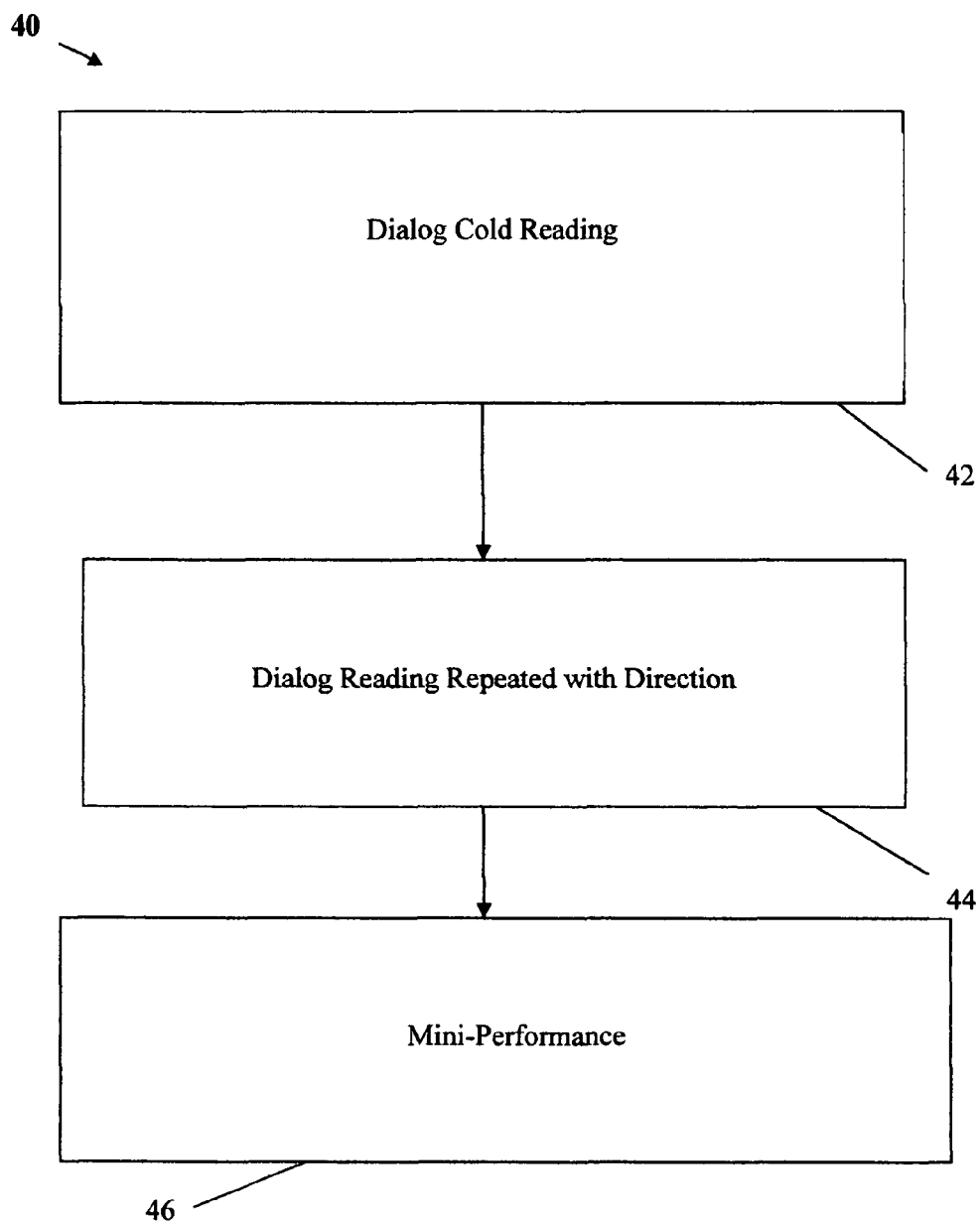
FIG. 4 is a flow diagram of the steps of the workshop reading of the script selection method of the present invention.

The steps of a preferred workshop reading 40 of the method 10 are depicted in the flow diagram of FIG. 4. In the first step 42 the dialog of the first of a scene pair is read by the assigned cast members seated at center stage, in a cold reading format, aloud to an audience, such as a paying audience, during a time period of approximately two minutes. The timing of this cold reading is preferably controlled by a stage manager using a timing device which can be seen by the audience but is not seen by the participating cast. Since the run time of each submitted scene is about four minutes, the cold reading of this first step 42 will routinely cover only a part of the subject scene.

In the next step 44 the part of the scene which has been cold read is then directed by a stage director who guides the participating cast during a three minute time period to answer three sets of questions about the scene they just read, and particularly about the character each cast member is portraying, such as: (1) What is the moment before? What is happening right before the first words of this scene are spoken? (2) What is the actor fighting for? What is the actor trying to get the other actor to do in this scene? (3) Can you define the love in the scene? Boyfriend girlfriend, sister brother, lovers, friends, etc.

In the next step 46 the scene is then put on its feet. Simple folding chairs are used to set up a location, and define the performance space. For the next seven minutes the cast work to answer and define the questions the director helped them to discover about the characters they are portraying in the scene while performing the scene. The director shouts out additional coaching suggestions from the side of the stage, encouraging the acting work and discovering aspects of the script which are entertaining engaging and truthful. This mini-performance end is concluded after the elapse of the seven minutes regardless of whether or not the scene has been performed in its entirety.

This workshop reading process 40, from its first step 42 through its last step 46, is then repeated using the second scene of the pair. The audience's, cast members' and non-cast actors responses to both of the scenes are then surveyed, as discussed below.

Round II—The Table Reading

The five scripts with the strongest survey results proceed from Round I to this Round II during which they are table read and surveyed. The two highest ranked scripts proceed to Round III. The submitted script scenes preferably are reformatted as described above for Round I.

The entire scripts are collected for the reading of Round H, which is a full table reading of each complete script by a designated cast in front of an audience, such as a paying audience. Participating are the cast of method 10, and the playwright. Following the reading a discussion session similar to a focus group format is used to draw feedback from the audience. The audience's, cast members' and non-cast actors responses to the script are then surveyed, as discussed below. A survey designed to obtain the feedback from theater professionals is used to assist the playwright with later revisions and rewrites. The scripts are ranked after the table reading of all five scripts. The two strongest scripts proceed to Round III and the remainder of the scripts are eliminated.

Preferably a Round II feedback spreadsheet is provided to each of the playwrights of the two scripts which are proceeding to Round III. The purpose of such a feedback spreadsheet is to succinctly illustrate the weaknesses and strengths of the scripts which have been identified from the survey responses. The survey answers are converted to numerical values for the feedback spreadsheets. The feedback spreadsheet preferably lists, in order, each survey question, the theoretical highest cumulative value that could have been received for the question, the value received from each survey participant, the total value actually received, the average value received, the difference between the total value actually received and theoretical cumulative value (which is the number to be reduced for the question's audience-reaction keyword or concept), and the ration of total received to theoretical. For each category of survey questions, namely, survey questions about the play, the character appeal, the emotion response, the yawn and/or "it" factor, the numerical values may be averaged or totaled. The feedback spreadsheet provides the playwright, and preferably the actors also, with a specific tool which identifies the aspects of the script requiring improvement and aspects of the script which are working and should be left alone. The playwrights involved in Round III may submit revised scripts for Round III, and therefore the method of the present invention is not only an elimination style script selection but also a script improvement process.

Round III—The Play-Off

The two strongest scripts from Round II proceed to this Round III during which they are rehearsed and stage-read. The submitted script scenes preferably are reformatted as described above for Round I.

Each of the two scripts will be rehearsed by the designated cast. Each script will received approximately twenty-one hours of rehearsal time over a four-week period. This rehearsals and performance format will include stage lights, sound effects, props, and milk-crate style set pieces. During the rehearsal process of Round III, participating playwrights are urged, and expected, to revise and rewrite their scripts, test alternatives, and take advantage of the collective input they receive.

This final script competition will be comprised of separate performances of the scripts, over two weekends, where an audience, such as a paying audience, will provide feedback using a survey discussed below. The strongest script proceeds to full performance.

Scoring the Rounds

Each of the surveys for the respective Rounds includes a set of statements, and the participants indicate on the survey their degree of agreement or disagreement with each statement by making a selection from the following list. (1) disagree strongly; (2) disagree; (3) disagree somewhat; (4) neutral (neither agree nor disagree); (5) agree somewhat; (6) agree; and (7) agree strongly. The numeric designations assigned to each selection here are not displayed on the survey forms but are the numerical values to which the selections are later converted for ranking purposes. By this method of scoring the Rounds, the present invention provides an elimination-style script-selection method which reduces system-induced bias and partiality by the avoidance of visible numeric rankings of response selections, and by the availability of neutral response positions.

In FIG. 5 there is shown a sample Round I survey form 50. As discussed above, the scripts are screened in Round I based on two scenes which separately undergo workshop reading. The survey form 50 provides audience and any non-audience participants with a preliminary survey 52 for the first scene. The preliminary survey 52 is used as a reference to help survey participants remember their initial responses to the first scene. The preliminary survey 52 is preferably provided together with the core survey 54 relating to both scenes on the single form 50, but the data collected from the preliminary survey 52 is not used to create any numerical values. The inclusion of a preliminary survey 52 relating only to the first scene provides an elimination-style script-selection method which reduces system-induced recall deficiencies by the availability of such inter-segment preliminary queries.

The core survey 54 is preferably comprised on both script-descriptive queries 56 and participant-descriptive queries 58. Each query of both types is comprised of a statement combined with the range of selections from strongly disagree to strongly agree.

The script-descriptive queries of the core survey 54 encompass the survey-participant experience and/or opinions on the script, for instance, as shown in FIG. 5, the participant's opinions on scene originality, character integrity, dialog quality, content appeal, attention-holding capacity and interest generation. These script-descriptive queries produce responses which represent, via participant opinions, the experience the participants received from viewing, participating and/or working with both scenes. The key numerical value is derived only from the responses to the script-descriptive queries 56, which are assigned numerical values as described above. These numerical values are totaled for each survey completed. For a survey such as seen in survey form 50, with six queries in the script descriptive queries 56, the total numeric value of each completed survey will be within the range of six to forty-two. This number is then recorded, preferably on a computer software spreadsheet and referenced using the AAP number.

The participant-descriptive queries 58 assess participant perceptions regarding their own response to the scenes and survey. The participant-descriptive queries 58 are scored in the manner described above but are used separately as tie-breaking factors and/or key numerical value adjustment factors.

The survey form 50 also includes an AAP number calculation section 60 which explains how to calculate the participant's individual AAP number and a space for recording the AAP number on the otherwise anonymous form 50.

The same AAP number is also elicited on a questionnaire which determines whether the participant is a frequent theater patron or a non-frequent theater patron. Such a questionnaire may simply ask how many theatrical plays the participant attended during the prior year, or prior two years or three years. The questionnaire may of course be more elaborate. Regardless of its simplicity or complexity, the questionnaire must elicit sufficient information to enable the participant's placement in either the frequent theater patron category or a non-frequent theater patron category, and then associate the category with the individual AAP number. Although the data collected or other experience may dictate where to place the dividing line between categories, the dividing line should be selected from the range of two to eight play attendances per year. As a default, a dividing line of eight per year is not unreasonable, wherein the frequent theater patron category includes persons who attend more than eight theatrical plays a year. Persons whose attendance is less than that are placed within the non-frequent theater patron category. The category is then associated with the participant's AAP number so that the charisma factor can be determined.

Alternatively, more than two frequency categories may be used. For instance, theater attendance at zero to two performances a year may be considered the lowest frequency category, or least likely to attend a performance, while attendance at more then eight performances a year may be considered the highest frequency categories, or the likely to attend a performance, and one or more middle categories may fall between these extremes.

The present invention uses the frequency categories in combination with the key numerical values, which are associated anonymously through the individual AAP numbers, to detect or recognize survey response-patterns that signal script charisma not otherwise revealed by, or seen in, straight survey tallies (key numerical values). The present script-selection method collects data external to the direct survey tallies and then uses the tally-external data to detect or recognize parallel survey responses from participants of disparate theatrical-patronage (frequency) patterns. Upon detection of a set of parallel survey responses, a weight adjustment factor is used to convert raw survey tallies into refined survey tallies.

In the example of the method 10, if (a) a "least likely" theater patron participant has a high key numeric value (survey tally) for a given script in Round I, for instance a raw survey tally which is higher than the "24" mean of the 6-42 range, and (b) a "likely" theater patron participant also has a high survey tally for that same script, then a parallel survey response is detected or recognized and the survey tally of the "least likely" theater patron is increased by a pre-selected factor, such as a factor within the range of from about 5 percent to about 20 percent, with about 10 percent being preferred. It is to be understood that the application of a charisma factor can lead to refined survey tallies higher than the "42" maximum raw survey tallies. The value of the charisma factor can alternatively depend on the frequency level when more than one category is recognized below the "likely" category, for instance applying a 10 percent charisma factor increase to a "least likely" participant when parallel survey response exists, and only a 5 percent charisma factor increase for a middle category participant where parallel survey response exists.

The placing of survey participants into frequency categories could instead be pragmatically determined, for instance by placing the top-attendance ten or twenty percent in the "likely" category and the lowest-attendance ten or twenty percent in the "least likely" category. Such a pragmatic approach guarantees that there are survey participants in both the "likely" and "likely" categories, so that the occurrence of a parallel survey response is always possible, but of course never guaranteed. For such a system, survey participants can be asked the number of live theater performances they attended during the prior year (prior twelve months) rather than having participants select a range, and an exclusion or inclusion determinant, or combination of determinants, may be chosen.

Example 1

Pragmatic Frequency Category Determination

For this demonstrative instance, a group of fifty survey participants is used for illustration purposes. Each participant is asked the number of live theater performances he or she attended during the prior year (prior twelve months), and the responses, ranked by numeric value, are: 0, 0, 0, 0, 1, 1, 1, 1, 2, 2, 2, 3, 3, 3 . . . 7, 8, 8, 8, 9, 9, 9, 10, 10, 11, 11, 11, 11, 12, 12, 15. Using a 20 percent gauge, which would be represented by ten participants, and merely counting off from the left and from the right would place both dividers within a frequency group: namely: 0, 0, 0, 0, 1, 1, 1, 1, 2, 2←2, 3, 3, 3 . . . 7, 8, 8, 8, 9, 9,→9, 10, 10, 11, 11, 11, 11, 12, 12, 15. Impartiality requires that all frequency-2 participants and all frequency-9 participants be included or excluded from respectively the least-likely and likely categories. Preferably exclusion or inclusion determinant is predetermined, to avoid influence by the rankings themselves. A full exclusion determinant excludes all in the divided frequency groups, namely the frequency-2 and frequency-9 participants, providing a least-likely group of eight participants and a likely group of nine participants. A full inclusion determinant includes all in the divided frequency groups, providing a least-likely group of eleven participants and a most-likely group of twelve participants. The determinants applied may be split, for instance an exclusion/inclusion set of determinants, which provides a least-likely group of eight participants and a likely group of twelve participants, or instead an inclusion/exclusion set of determinants, which provides a least-likely group of eleven participants and a likely group of nine participants. A 10 percent gauge would place the divider after and before respectively the lowest five and highest five, and again exclusion/inclusion determinants would control whether the frequency-1 participants and the frequency-11 participants would be included or included from the least-likely and likely categories.

As noted above, the five highest-scoring scripts of Round I proceed to Round II, and the rest are eliminated from the competition.

In FIG. 6 there is shown a sample Round II survey form 70. As discussed above, the scripts are screened in Round II based on a table reading of the entire script. The survey form 70 therefore does not have, or need, any preliminary queries.

The core survey 74 is preferably comprised on both script-descriptive queries 76, which are more numerous, more sophisticated and more complex than the queries used in Round I as shown, and participant-descriptive queries 78. Each query (both types) is comprised of a statement combined with the range of selections from strongly disagree to strongly agree as described above, and the responses are scored in the same manner as discussed above for Round I. The survey form 70 also includes an AAP number calculation section 80 which explains how to calculate the participant's individual AAP number and a space for recording the AAP number on the otherwise anonymous form 70, again as described above. A questionnaire for assigning performance attendance frequency categories and the association of frequency categories with survey tallies through the AAP numbers as described above are also used in Round II.

A charisma factor, as described above in the explanation of Round I, is also applied when a "least likely" participant has a high survey tally for a given script in Round II, and parallel response exists (a "likely" participant has a high survey tally for the same script) although the charisma factor applied is preferably lower, for instance only 5 percent, if it is triggered only in Round II. If a "least likely" Round II participant was also a Round I participant and has high survey tallies for the same play in both Rounds, and there is a parallel response determined, then the charisma factor applied to that participant's raw survey tally is high, preferably about 15 percent.

As noted above, the two highest-scoring scripts of Round II proceed to Round III, and the rest are eliminated from the competition.

The survey form, and manner of using and scoring the survey, including the application of a charisma factor if present, in Round III may be, and preferably is, the same as used in Round II, and shown in FIG. 7. Therefore the descriptions of the surveys will not be repeated here, except to note, as discussed above, that the numerical survey scores received in Round III determines which of the final two scripts wins the competition and proceeds on to full production.

Example 2

Survey Questions

Exemplitive Round I survey questions are set forth below in Table 1, wherein Cptn means caption and Q# means question number.

TABLE 1

| Cptn | Q# | Question Proposition | Type |
|---|---|---|---|
| | | 1$^{st}$ Scene | |
| | 1 | This scene was original | |
| | 2 | The characters are written truthfully | |
| | 3 | The dialog enhances the scene | |
| | 4 | I like the content of this scene | |
| | 5 | This scene was riveting | |
| | | Yawn Factor | |
| | | I was bored with the scene | |
| | | Your Reactions to Both Scenes | |
| | 1 | These scenes were original | |
| | 2 | The characters are written truthfully | |
| | 3 | The dialog enhances the scenes | |
| | 4 | I like the content of these scenes | |
| | 5 | These scenes were riveting | |
| | 6 | | |
| | | Yawn Factor | |
| | | I was bored with the scenes | |
| | | I completed this survey pretty quickly | |

Exemplitive Round II/III survey questions are set forth below in Table 2, wherein Cptn means caption and Q# means question number.

TABLE 2

| Cptn | Q# | Question Proposition | Type |
|---|---|---|---|
| | 1 | This play engaged me from the start | |
| | 2 | This play's plot is well developed | |
| | 3 | The play's story-lines and sub-plots are clear | |
| | 4 | I "get" the theme/statement of this play | |
| | 5 | This play's dialog really works for me | |
| | 6 | This play made me think, reflect, imagine | |
| | 7 | This story is original, vibrant, riveting | |
| | 8 | I enjoyed the content of this play | |
| | | Character Appeal | |
| | 1 | The characters are believable | |
| | 2 | The characters of this play are unique and original | |
| | 3 | I can see, hear, feel the characters - they are well developed | |
| | 4 | The strengths and weaknesses of the characters are clear | |
| | | Is that for here or to go? | |
| | 1 | I would pay to see this play in a full production | |
| | 2 | I would recommend this play to a friend | |
| | | Yawn Factor | |
| | | I was bored with the scenes | |
| | | I completed this survey pretty quickly | |

Survey Premise

The present invention is not dependent upon this premise. The scoring or survey processes of Round I through Round III are designed to collect feedback of subjective thoughts and ideas (i.e., a plurality of opinions on a script) in an objective fashion. The premise is that the collective opinion of a group will lead to the best script among the entrants for positive audience reception. The goal is to find a script possessing or producing the type of focus or meeting point which creates blockbuster movies, extended-run plays, and top-forty songs, or the closest to that objective among the script entrants.

Subjective thoughts and ideas are, by definition, personal rather than impartial. Subjective thoughts and ideas derive from an individual's opinions or feelings, rather than springing from a source of facts or evidence, and therefore are inherently slanted, biased, prejudiced and/or narrow. One individual's subjective thoughts and ideas are inadequate to provide a litmus test for wider positive audience acceptance, while a composite of genuine subjective thoughts and ideas can yield a valid assessment.

The method of the present invention elicits subjective impressions of a plurality of participants and from them builds a composite strength valuation upon which a script is eliminated or advanced. The method of the present invention applies an inverse methodology whereby the scope of script presentation increases and the number of scripts being scored decreases. The method of the present invention severs the nexus between authors and presentations.

In preferred embodiments of the invention, the present invention provides an elimination-style script-selection method whereby the comparative audience-acceptance potential of a plurality of scripts is determined, comprising the steps of: (a) collecting at least x number of scenes from y number of scripts, wherein x and y are both independently integers, and wherein x is at least equal to y; (b) for each of the script separately, (i) performing a workshop reading of the scene(s) before a plurality of workshop reading participants, (ii) taking and scoring an audience-acceptance-level survey of each of the participants to provide a plurality of workshop reading raw survey tallies, (iii) taking and scoring a theater-patronage-frequency survey of each of the workshop reading participants to provide a plurality of workshop reading theater-patronage patterns matched up with the workshop reading raw survey tallies, (iv) detecting any parallel survey responses between workshop reading participants of disparate theatrical-patronage patterns, (v) upon detection of a set of the parallel survey responses, using a weight adjustment factor to convert a least one of the workshop reading raw survey tallies into a workshop reading refined survey tally, and (vi) determining a combined workshop reading survey score from the refined and raw workshop reading survey tallies; and (c) ranking the scripts by the combined workshop reading survey scores; and then (d) selecting the highest-ranking z number of the scripts, wherein z is an integer which is less than y, and eliminating the remainder of the scripts. In preferred embodiments, separately, x is 2y, y is at least about 25, and z is 5.

In further preferred embodiments, for each of the z number of selected scripts separately, the method includes the steps of (e) performing a full table reading of the script before a plurality of table-reading participants, (f) taking and scoring a table-reading audience-acceptance-level survey of each of the table-reading participants to provide a plurality of table-reading raw survey tallies, (g) taking and scoring a table-reading theater-patronage-frequency survey of each of the table-reading participants to provide a plurality of table-reading theater-patronage patterns matched up with the table-reading raw survey tallies, (h) detecting any parallel survey responses between table-reading participants of disparate theatrical-patronage patterns, (i) upon detection of a set of the parallel survey responses, using a weight adjustment factor to convert a least one of the table-reading raw survey tallies into a table-reading refined survey tally, and (j) determining a combined table-reading survey score from the refined and raw table-reading survey tallies; and (k) ranking the scripts by the combined table-reading survey scores; and selecting the highest-ranking zz number of the scripts, wherein zz is an integer which is less than z, and eliminating the remainder of the scripts. In preferred embodiments, zz is 2. In further preferred embodiments the method further includes the steps of: (h) for each of the zz number of selected scripts separately, rehearsing and then performing a full stage reading of the script before a plurality of stage-reading participants, taking and scoring a stage-reading audience-acceptance-level survey of each of the stage-reading participants to provide a plurality of stage-reading raw survey tallies, taking and scoring a stage-reading theater-patronage-frequency survey of each of the stage-reading participants to provide a plurality of stage-reading theater-patronage patterns matched up with the stage-reading raw survey tallies, detecting any parallel survey responses between stage-reading participants of disparate theatrical-patronage patterns, upon detection of a set of the parallel survey responses, using a weight adjustment factor to convert a least one of the stage-reading raw survey tallies into a stage-reading refined survey tally, and determining a combined stage-reading survey score from the refined and raw stage-reading survey tallies, and (k) ranking the scripts by the combined stage-reading survey scores; and (l) selecting the highest-ranking script.

The present invention also provides an elimination-style script-selection method whereby the comparative audience-acceptance potential of a plurality of scripts is determined in a first, second and third round, comprising the steps of: (a) collecting at least y number of scripts; (b) in each of the first, second and third rounds, (i) performing a reading at least a part of the scripts entering the round before a plurality of participants, (ii) surveying the participants, (iii) determining survey tallies, (iv) refining survey tallies by weighting parallel survey responses between participants of disparate theater-patronage patterns, and (v) feeding less than all of the entering scripts on to the next round and eliminating the remainder. In further preferred embodiments, separately or combined, the first round reading is a workshop reading of two scenes, the second round reading is a full-script table reading and the third round reading is a full-script stage reading. Additionally in preferred embodiments, separately or in combination, (1) the surveying is conducted with surveys including questions regarding participants' perception of speed of survey completion, and survey tallies are weighted when positive and survey-completion speed is perceived, and (2) the surveying is conducted with surveys having multiple-selection questions without participant-perceptible numeric rankings of answers. Further in preferred embodiments, separately or in combination, (1) the first round is comprised of workshop readings of first and second scenes from each script, and the surveys are conducted with preliminary survey questions for the first scenes and final survey questions for both scenes, (2) the scripts are submitted by playwrights and the first and second scenes are selected by the playwrights, and (3) first and second scenes each are have a running time of no more than four minutes.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

I claim:

1. A computer-implemented elimination-style script selection method whereby the comparative audience-acceptance potential of a plurality of scripts is determined, comprising the steps of:

collecting at least x number of scenes from y number of scripts having a plurality of scenes, wherein x and y are both independently integers, and wherein x is at least equal to y;

for each of said script separately, performing a workshop reading of at least one of said scenes before a plurality of workshop reading participants, taking and computer-implemented scoring a workshop audience-acceptance level survey having multiple queries of each of said participants to provide a plurality of workshop reading raw survey tallies, taking and scoring a workshop theater-patronage-frequency survey of each of said workshop reading participants to provide a plurality of workshop reading theater patronage patterns matched up with said workshop reading raw survey tallies, detecting any parallel workshop audience-acceptance-level survey responses between workshop reading participants of disparate theatrical-patronage patterns, upon detection of a set of said parallel survey responses, using a weight adjustment factor to convert a least one of said workshop reading raw survey tallies into a workshop reading refined survey tally, and determining a combined workshop reading survey score from said refined and raw workshop reading survey tallies; and ranking said scripts by said combined workshop reading survey scores; and selecting the highest-ranking z number of said scripts, wherein z is an integer which is less than y, and eliminating the remainder of said scripts.

2. A computer-implemented elimination-style script selection method according to claim 1 wherein x is 2y.

3. A computer-implemented elimination-style scripts election method according to claim 1 wherein y is at least about 25.

4. A computer-implemented elimination-style script selection method according to claim 1 wherein z is 5.

5. A computer-implemented elimination-style script selection method according to claim 1 further including the steps of:

for each of said z number of selected scripts separately, performing a full table reading of the script before a plurality of table-reading participants, taking and scoring a table-reading audience-acceptance-level survey having multiple queries of each of said table-reading participants to provide a plurality of table-reading raw survey tallies, taking and scoring a table-reading theater-patronage-frequency survey of each of said table-reading participants to provide a plurality of table-reading theater patronage patterns matched up with said table-reading raw survey tallies, detecting any parallel table-reading audience-acceptance-level survey responses between table-reading participants of disparate theatrical-patronage patterns, upon detection of a set of said parallel survey responses, using a weight adjustment factor to convert a least one of said table-reading raw survey tallies into a table-reading refined survey tally, and determining a combined table-reading survey score from said refined and raw table-reading survey tallies; and ranking said scripts by said combined table-reading survey scores; and selecting the highest-ranking zz number of said scripts, wherein zz is an integer which is less than z, and eliminating the remainder of said scripts.

6. A computer-implemented elimination-style script selection method according to claim 5 wherein zz is 2.

7. A computer-implemented elimination-style script selection method according to claim 5 further including the steps of:

for each of said zz number of selected scripts separately, rehearsing and then performing a full stage reading of the script before a plurality of stage-reading participants, taking and scoring a stage-reading audience-acceptance-level survey having multiple queries of each of said stage-reading participants to provide a plurality of stage-reading raw survey tallies, taking and scoring a stage-reading theater-patronage-frequency survey of each of said stage-reading participants to provide a plurality of stage-reading theater patronage patterns matched up with said stage-reading raw survey tallies, detecting any parallel table-reading audience-acceptance-level survey responses between stage-reading participants of disparate theatrical-patronage patterns, upon detection of a set of said parallel survey responses, using a weight adjustment factor to convert a least one of said stage-reading raw survey tallies into a stage-reading refined survey tally, and determining a combined stage-reading survey score from said refined and raw stage-reading survey tallies; and ranking said scripts by said combined stage-reading survey scores; and selecting the highest-ranking script.

8. A computer-implemented elimination-style script-selection method according to claim 1 wherein said multiple queries are selected from the group consisting of said participant's opinion scene originality, character integrity, dialog quality, content appeal, attention-holding capacity and interest generation.

* * * * *